Nov. 15, 1927.  
C. J. BISHOP  
GLASS CUTTING HOLDER  
Filed March 2, 1926  
1,649,282

Inventor  
C. J. Bishop  
By G. C. Kennedy  
Attorney

Patented Nov. 15, 1927.

1,649,282

UNITED STATES PATENT OFFICE.

CHARLEY J. BISHOP, OF CEDAR FALLS, IOWA.

GLASS-CUTTING HOLDER.

Application filed March 2, 1926. Serial No. 91,783.

My invention relates to improvements in adjustable glass holders, and the object of my improvement is to supply a device particularly adapted to receive and adjustably hold and clamp securely a plate of glass, whereby it may be cut by means of a glazier's tool without displacement and along a line of a desired angularity relative to another of its edges.

This object I have accomplished by the means which are hereinafter described and claimed, and which are illustrated in the accompanying drawings, it being understood that changes in the precise embodiment of invention herein disclosed can be made within the scope of what is claimed without departing from the spirit of the invention.

Figure 1:
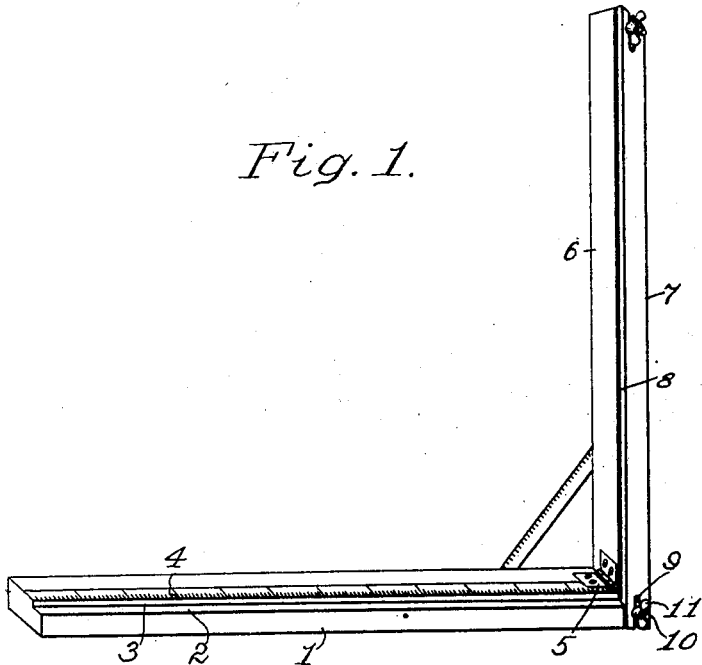
Figure 3:
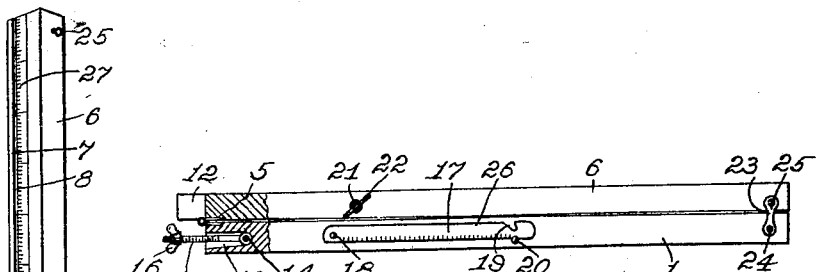
Figure 2:
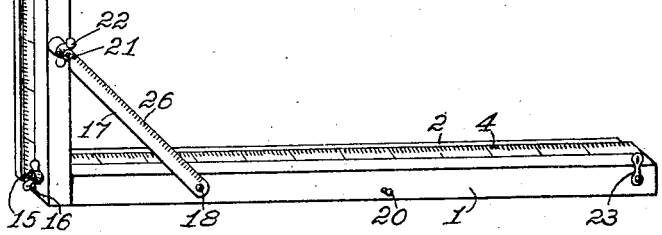

In said drawings, Figs. 1 and 2 are perspective views of opposite sides of my invention as extended. Fig. 3 is a side elevation thereof as folded together, with parts in longitudinal section.

My improved glass holding device is composed of two elongated beams or members 1 and 6 connected by means of a hinge 5 so that one may be folded or swung back upon the other to a collapsed position for carriage or compactness when not in use, and when so collapsed together the members may be secured releasably together by means of any appropriate fastenings as the headed pin 25 on one member engaged by a slitted flexible member 23 secured by a headed nail 24 in the other member.

The member 6 may be swung upwardly relatively to the horizontal member 1, and then held adjustably and releasably at a desired angle relative thereto by the following means. The numeral 17 denotes a swinging bar having graduations 26 along both sides at one longitudinal edge for indicating different angles of the member 6 as set relatively to the member 1. This bar is pivoted to the member 1 on a pin 18 and its other end is notched at 19 to be seated upon a threaded pin 21 fixed in the member 6 and secured by a wing-nut 22 when the members are at a right angle to each other. However, when the members 1 and 6 are at another relative angle to each other less than a right angle, as indicated by the graduations 26, the bar 17 may ride upon the pin 21 and yet be clamped in that position by the wing-nut 22. I do not desire to be limited to said specific adjusting and fastening devices for mechanical equivalents therefor may be used within the scope of this invention. The bar 17 is stopped by a pin 20 when swung back.

When at a right angle or approximately so, the following devices may be employed to hold the member 6 in said position. An eye on one end of a threaded rod or arm 15 is rockably seated on a cross-bolt 14 in one end of the member 1 transversely, said bolt or arm 15 being mounted for limiting swinging in a recess 13 of said member 1. The nut engages the vertical outer face of the member 6 to hold said members at their angle rigidly.

The numeral 7 denotes a clamping bar opposed longitudinally to the face of the member 6 opposite that carrying said pin 21 and wing-nut 22. The opposite ends of the bar 7 are slotted at 9 longitudinally for a short distance. Threaded pins 10 are fixed in the member 6 to extend through said slots and to receive wing-nuts 11, so that a plate of glass may be inserted through the narrow interspace 8 and then adjustably clamped between the bar and said member in rigid position.

The member 1 has along its upper face a shouldered part at 3 affording a shelf 2 and one edge of the plate of glass may rest upon this shelf with one face abutting said shoulder 3 when the plate is clamped upon the member 6 as above described. It will be understood that while the device is shown with the member 6 erect, that it may be used laid upon a supporting surface with both members 1 and 6 horizontal when more convenient for the operator in cutting the plate along the outer face of the member 6. The member 1 has graduations 4 of any desired scale along the edge of said shoulder at the top, while the member 6 has graduations 27 along its outer face ending at the interspace 8.

The device may therefore be used in cutting glass to have its edges at any desired relative angle to each other.

Having described my invention, what I claim as new, and desire to secure by Letters Patent, is:

1. In a straight-edge type instrument, a pair of elongated members, means hingedly connecting said members at an end of each, the hinged ends of said members having recesses adapted to align when the members are in right angular relation, means swingingly mounted in one of the said recesses to traverse the other recess when the members are right angularly positioned, and a device adjustably mounted on said swinging means for releasably locking said members in angularly adjusted positions.

2. In a straight-edge instrument, a pair of elongated members, means hingedly connecting said members at an end of each, said members having respective side surfaces in the same plane, a clamping bar along one side surface of one of said members, and means for clamping said bar to said member to accommodate glass plates of various thicknesses therebetween.

3. In a straight-edge instrument, a pair of elongated members, means hingedly connecting said members at an end of each, said members having respective side surfaces in the same plane, a clamping bar along one side surface of one of said members, means for clamping said bar to said member to accommodate glass plates of various thicknesses therebetween, the abutting end parts of said members being recessed, a threaded rod pivoted in the recess of one member at one end to swing in said recess, said rod projecting to be received in the recess of the other member at an angular relative position of the latter to the former, and clamping means adjustably mounted on said rod to clamp the two members together in a desired relative angular position.

In testimony whereof I affix my signature.

CHARLEY J. BISHOP.